United States Patent
Mandal et al.

(10) Patent No.: US 7,155,501 B2
(45) Date of Patent: *Dec. 26, 2006

(54) METHOD AND APPARATUS FOR MANAGING HOST-BASED DATA SERVICES USING CIM PROVIDERS

(75) Inventors: Chhandomay Mandal, Nashua, NH (US); Jillian I. DaCosta, Nashua, NH (US); Lanshan Cao, Andover, MA (US); Roberta A. Pokigo, Billerica, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 976 days.

This patent is subject to a terminal disclaimer.

(21) Appl. No.: 10/147,275

(22) Filed: May 16, 2002

(65) Prior Publication Data

US 2003/0217195 A1    Nov. 20, 2003

(51) Int. Cl.
*G06F 15/173* (2006.01)
(52) U.S. Cl. ...................................................... 709/223
(58) Field of Classification Search ................. 709/223
See application file for complete search history.

(56) References Cited

U.S. PATENT DOCUMENTS

| | | | |
|---|---|---|---|
| 4,961,139 A | 10/1990 | Hong et al. | |
| 5,150,308 A | 9/1992 | Hooper et al. | |
| 5,452,447 A | 9/1995 | Nelson et al. | |
| 6,317,748 B1 * | 11/2001 | Menzies et al. | ......... 707/103 X |
| 6,643,671 B1 | 11/2003 | Milillo et al. | |
| 6,769,001 B1 | 7/2004 | Halstead et al. | |
| 6,769,124 B1 | 7/2004 | Schoening et al. | |
| 6,775,700 B1 * | 8/2004 | Cheng et al. | ................ 709/225 |
| 2005/0120101 A1 * | 6/2005 | Nocera | ........................ 709/223 |

* cited by examiner

*Primary Examiner*—Nasser Moazzami
*Assistant Examiner*—Pramila Parthasarathy
(74) *Attorney, Agent, or Firm*—Dorsey & Whitney LLP

(57) ABSTRACT

Management of data services in a distributed computer system is provided by a three-tiered system. The lowest, or agent, tier comprises Common Information Model (CIM) provider objects that can make method calls on the low-level kernel routines in the host providing the data service. The middle, or logic, tier is a set of management facades and federated Java beans. The federated Java beans include a general configuration bean for data services and configuration and health monitor service beans for each individual data service. The upper, or presentation, tier of the inventive system comprises web-based presentation programs that provide a first view go of the services provided by the federated beans for policy-based management and a second view of the data management facades for element-based management.

28 Claims, 13 Drawing Sheets

METHOD AND APPARATUS FOR MANAGING HOST-BASED DATA SERVICES USING CIM PROVIDERS

FIELD OF THE INVENTION

This invention relates to management of networked computer systems and to data services such as replication, mirroring, and data "snapshots" and, in particular, to distributed management of such data services.

BACKGROUND OF THE INVENTION

It is common in many contemporary computer systems to provide administrative personnel with data services that allow data storage to be controlled and backup copies of stored data to be made where necessary. These data services can include data volume management in which one or more logical "volumes" are created from stored data so that the data in each volume can be manipulated as a unit.

Data backup services may include data replication in which a second copy or "mirror" of information located at a primary site is maintained at a secondary site. When changes are made to the primary data, updates are also made to the secondary data so that the primary data and the secondary data remain "synchronized."

Another data backup service that can be provided is data imaging in which a data copy often called a data "snapshot" or "image" can be made of stored data at a designated point in time. This service provides a system administrator with the ability to make and to maintain the aforementioned replicated data storage systems.

Still other data services can be provided. For example, data stored and retrieved in a data storage system may be transferred through a fast cache memory in a process called "data caching" in order to improve overall data storage performance. Often it is desirable for system administrators to be able to control whether data caching is used with a particular data storage or a data volume residing on that storage in order to effectively use a limited resource.

No matter which of the data services are used, a significant amount of management time can be consumed in initially setting up the data service and managing it after it is running. For example, management of each of the aforementioned data services requires the ability for a manager to discover volumes existing in the system, verify that those volumes are suitable for use with a particular data service and configure the volumes if they are not suitable.

In a large, distributed computer system connected by a network, management personnel and resources may be physically located anywhere in the system. However, the data manipulation processes, which actually perform the data services, are typically low-level routines that are part of an operating system kernel running on a particular machine. These routines typically must run on that machine and must be written in a platform-dependent language. Thus, prior art systems required a manager to physically log onto each local host in a distributed system in order to manage data services. Further, there was no way to diagnose problems that occurred when several data services were using the same volume.

SUMMARY OF THE INVENTION

In accordance with the principles of the present invention, management of data services is provided by a three-tiered system. The lowest, or agent, tier comprises Common Information Model (CIM) provider objects that can make method calls on the low-level kernel routines in the host providing the data service. The middle, or logic, tier is a set of management facades and federated Java beans. The federated Java beans include a general configuration bean for data services and configuration and health monitor service beans for each individual data service. The upper, or presentation, tier of the inventive system comprises web-based presentation programs that provide a first view of the services provided by the federated beans for policy-based management and a second view of the data management facades for element-based management.

In one embodiment, each CIM provider instance operates in a CIM object manager (CIMOM) running in the host and is represented by a management facade that is created and deleted by a management facade factory when the CIM provider instance is created and deleted.

In another embodiment, each data service is managed by a separate Jiro-based federated bean. The bean need not be running in the host that is providing the data service and can be running anywhere in the network. The beans export interfaces containing methods that can be called by the presentation programs so that management personnel located anywhere on the network can access and control the data services in a particular host.

In yet another embodiment, the management facades and federated beans reside in a management server that, in turn, is located in a shared Jiro™ station.

In still another embodiment, the presentation programs are web-based graphic user interfaces (GUIs) that use a lookup service to obtain a proxy to selected federated beans. The GUIs then use that proxy to make methods calls on the beans to manage the data services controlled by the beans.

BRIEF DESCRIPTION OF THE DRAWINGS

The above and further advantages of the invention may be better understood by referring to the following description in conjunction with the accompanying drawings in which.

DETAILED DESCRIPTION

Data Services are software products that consist of two parts: a set of kernel drivers, which provides the actual service on local host platforms, and the user level management software. The kernel drivers would generally by implemented in platform-specific code, for example, in C routines that expose application programmer interfaces (APIs) that can be accessed only from the host in which the layer is installed. The set of kernel drivers providing the service can be installed on application servers as well as dedicated storage servers. These installations are illustrated in FIGS. 1A and 1B.

Figure 1:
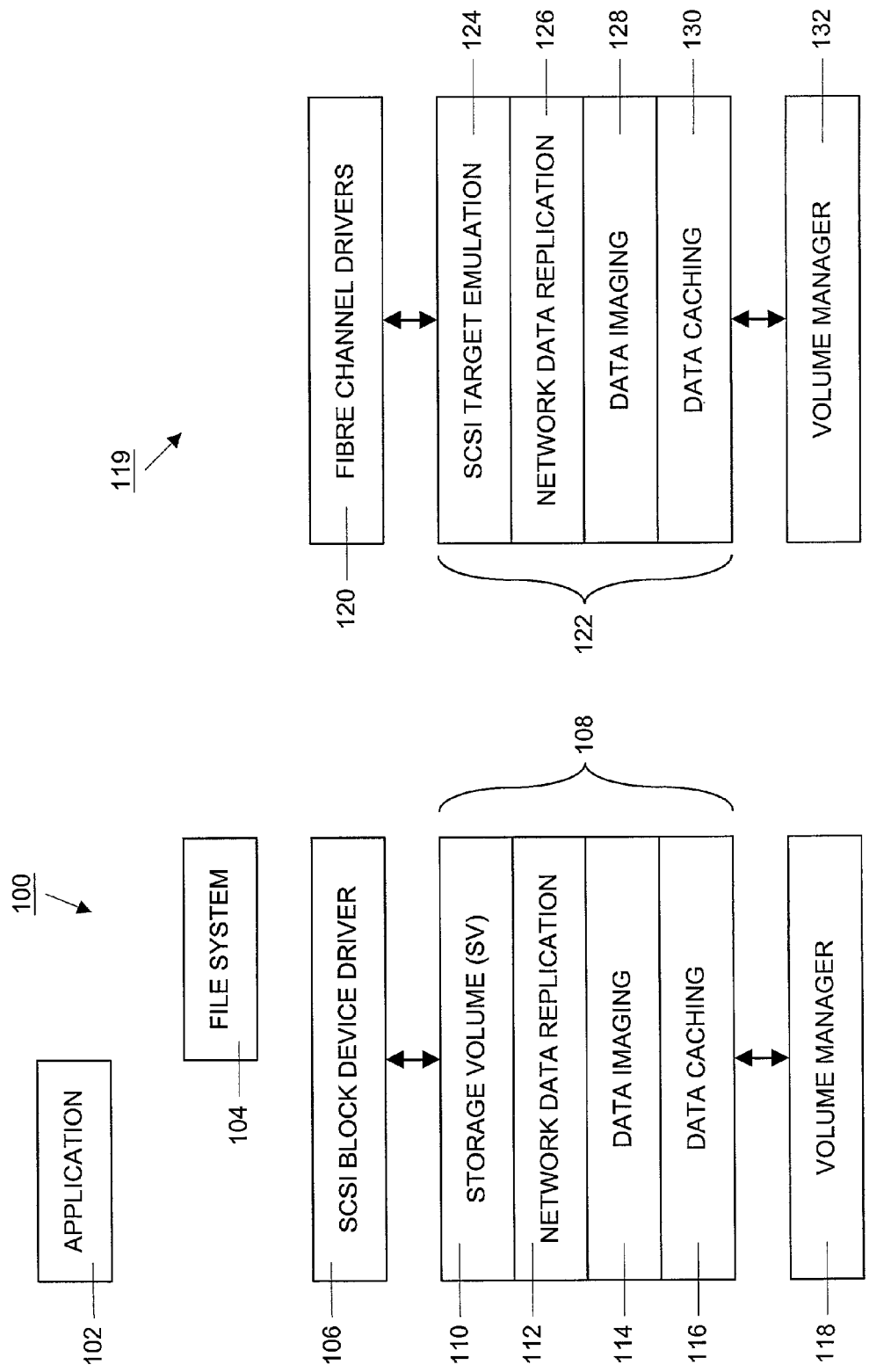
FIG. 1A is a block schematic diagram of illustrating the platform-specific kernel drivers that provide a variety of data services in an application server.
FIG. 1B is a block schematic diagram of illustrating the platform-specific kernel drivers that provide a variety of data services in a storage server.

As shown in FIG. 1A, on an application server 100, the data service kernel modules 108 layer within the operating system I/O stack above volume manager 118 and below the disk device drivers 106. The data service kernel modules include a storage volume module 110 that implements a storage volume (SV) interface data service that provides data redirection. In particular, the storage volume layer 110 insinuates itself between the standard Small Computer Standard Interface (SCSI) block device driver 106 and the underlying drivers and shunts I/O information through the other data service kernel modules 112–116.

The storage network data replicator (SNDR) kernel module 112 provides data replication services that involve transparent replication of volumes over public or private Internet protocol infrastructure, or locally, via SCSI protocol, over fibre channel connections.

The data imaging module 114 implements a "point-in-time" volume copy data service between volumes in a data image volume set. The data image volume set contains the original logical volume (the master volume), the point-in-time copy of the original (the shadow volume) and a volume used to store a bitmap that tracks the differences between the master and shadow volumes. Once the data image volume set is established, the master and shadow volumes can be accessed independently. The data-imaging module allows data updates to be sent from the master volume to the shadow volume as well as updates to be sent from the shadow volume to the master volume when desired.

The caching module 116 provides block based caching operations for disk input/output. These operations provide typical caching functionality, such as read caching, read ahead and small write coalescing for sequential writes. Module 116 also provides write caching when non-volatile RAM cards are installed as a safe store (called a "fast write cache").

On a dedicated storage server 119 as illustrated in FIG. 1B, the kernel modules 122 are located between fibre channel drivers 120 and the volume manager software 132. Modules 122 are accessed through an emulation layer 124 that allows the storage server to appear as a SCSI target to fibre-channel-connected open system hosts. Thus, the SCSI Target Emulation (STE) module 124 provides an STE data service that allows any backend storage to be exported for use on another host through a fiber channel. The host that has the STE kernel module 124 runs a fibre port in SCSI target mode, while the fibre ports at the client run as SCSI initiators.

The network data replicator module 126, the data imaging module 128 and the data caching module 130 operate in the same manner as they do in the application server example shown in FIG. 1A. The data service kernel module architecture requires that any volume that will be used by a data service must already be under the control of either the SCSI Target Emulation (STE) data service module 124, or the Storage Volume Interface (SVI) data service module 110. The difference is that the STE volumes are always exported to remote hosts whereas local volumes must be SVI volumes.

A data services management system constructed in accordance with the principles of the invention comprises three layers or tiers. The presentation tier comprises a collection of GUIs with which a manager interacts at a single host location. The presentation tier, in turn, interacts with a middle, or logic, tier comprised of a plurality of federated beans, each of which performs specific tasks in the data services system. Some of the beans can communicate with management facades that are also located in the logic tier. Management facades represent, and communicate with, CIM providers located in the lowest or agent tier. The CIM providers control the aforementioned kernel modules that actually perform the data services. In this manner, an entire data service system can be configured and managed from a single location.

Figure 2:
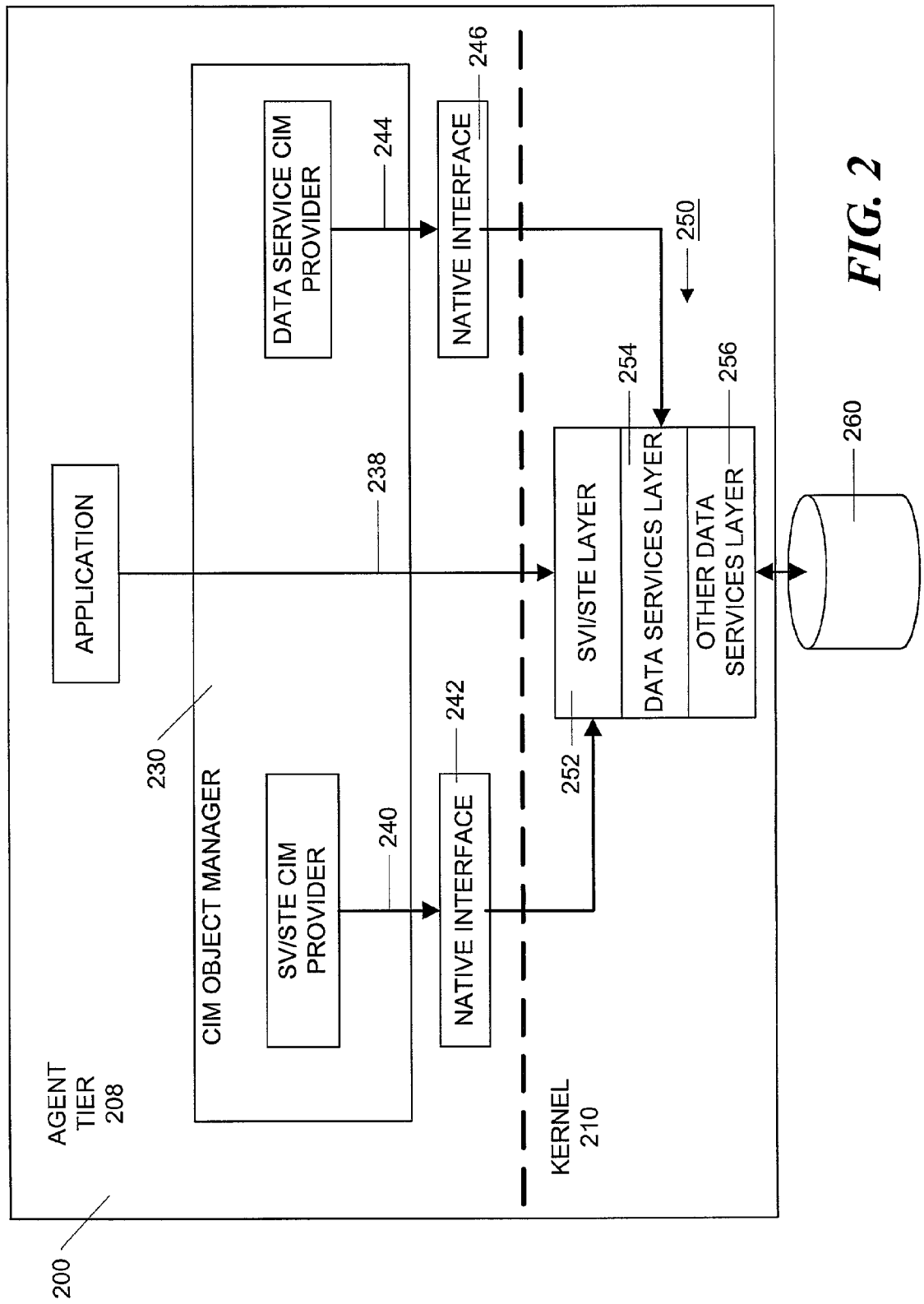
FIG. 2 is a block schematic diagram of software that runs in a local host for providing a data imaging service, illustrating a CIM object manager and CIM providers that, via native interfaces, access the kernel layers that provide the data imaging service.

FIG. 2 shows a host system 200 that illustrates the contents of the agent tier running in a single host. The data service management capability of the invention is actually implemented in the kernel layer 210 shown running in host 200 in FIG. 2. In particular, access by the host 200 to a resource 260, which can be a data storage component, is provided by a layered stack 250 comprising the aforementioned SVI or STE layer 252, as appropriate. Application programs running in host 200, such as application 228, and the host file system access resource 260 though the layered stack 250 as indicated schematically by arrow 238.

In order to provide for data service management capability in accordance with the principles of the invention, the SVI/STE layer 252 and the data services layer 254 are controlled by software running on the lower tier 208 of the inventive data services system. The lower tier includes a native interface 242 that converts the APIs exported by the SVI/STE layer 252 into a platform-independent language, such as Java™.

An object, called a CIM provider 232, provides the required remote management capability and controls the native interface 242, as indicated schematically by arrow 240. The Common Information Model, or CIM, is an object-oriented information model for describing managed resources such as disks, CPUs, and operating systems. This model is a proposed industry standard that is promulgated by the Distributed Management Task Force, Inc. and is described in detail in the Common Information Model Specification, version 2.2, Jun. 14, 1999.

CIM describes overall management information in a network enterprise environment and is comprised of a Specification and a Schema. The Specification defines the details for integration with other management models, while the Schema provides the actual model descriptions In the CIM model, managed resources, such as printers, disk drives, or CPUs are represented by CIM objects. CIM objects can be shared by any WBEM-enabled system, device, or application. CIM objects with similar properties and purposes are represented as CIM classes. Properties are attributes that describe a unit of data for a class. An instance is a representation of a managed object that belongs to a particular class. Instances contain actual data. For example, Solaris_ComputerSystem is a CIM class that represents a computer that runs the Solaris™ operating environment. Solaris is a trademark of Sun Microsystems, Inc. The Solaris software that runs on a SUN workstation is an instance of the Solaris_OperatingSystem class. ResetCapability and Install-Date are examples of properties of the Solaris_ComputerSystem class.

Each schema comprises a meaningful collection of CIM classes with a single owner (an organization). Schemas are used for administration and class naming and each CIM class can belong to only one schema. All class names must be unique within a particular schema. The schema name is the determining factor in differentiating classes and properties from others that may have the same name.

The Common Information Model categorizes information from general to specific and each CIM schema is divided into three layers of information. These include a core layer that comprises a subset of CIM not specific to any platform and a common layer that comprises information which visually depicts concepts, functionality, and representations of entities related to specific areas of network management, such as systems, devices, and applications. The third layer is an extension layer that comprises information models that support the CIM Schema and represent a very specific platform, protocol, or corporate brand.

CIM objects are, in turn, managed by a CIM Object Manager (CIMOM) that stores the CIM objects internally as Java classes. When a client application accesses information about a CIM object, the CIM Object Manager contacts either an appropriate CIM "provider" for that object or a CIM Object Manager repository that contains data regarding the objects. A CIM provider is a class that communicates with managed objects to access data.

More specifically, when a client application requests data from a managed resource and the data is not available from the CIM Object Manager repository, the CIM Object Manager forwards the request to the provider for that managed resource using object provider APIs to communicate with providers. The provider then contacts the resource and dynamically retrieves the information. For example, in response to a request from the CIM Object Manager to retrieve information regarding a device, a provider gets native information from a device, maps the native information format to CIM classes, and passes the information to the CIM Object Manager in the form of the CIM classes. In response to a request to send information to a device, a provider maps the information from CIM classes to native device format, gets the required information from the CIM class and passes the information to the device in native device format.

In FIG. 2, two CIM providers are shown in CIM object manager 230. These include the SV/STE CIM provider 232 that interfaces with native interface 242 as indicated schematically by arrow 240 to send information to, and receives information from, the SV/STE layer 252 and CIM provider 234 that interfaces with native interface 246, as indicated schematically by arrow 244, to pass information to and from data service layer 254. CIM provider 234 represents a plurality of data service CIM providers that manage individual data service layers represented by data service layer 254. A provider and native interface would be provided for each specific data service that is running on the host although only one such layer 254 is shown in FIG. 2. For example, the host shown in FIG. 2 could be running one or more data services, including data imaging or point-in-time copy services, network data replication services, cache management services, and data volume management services.

Figure 3:
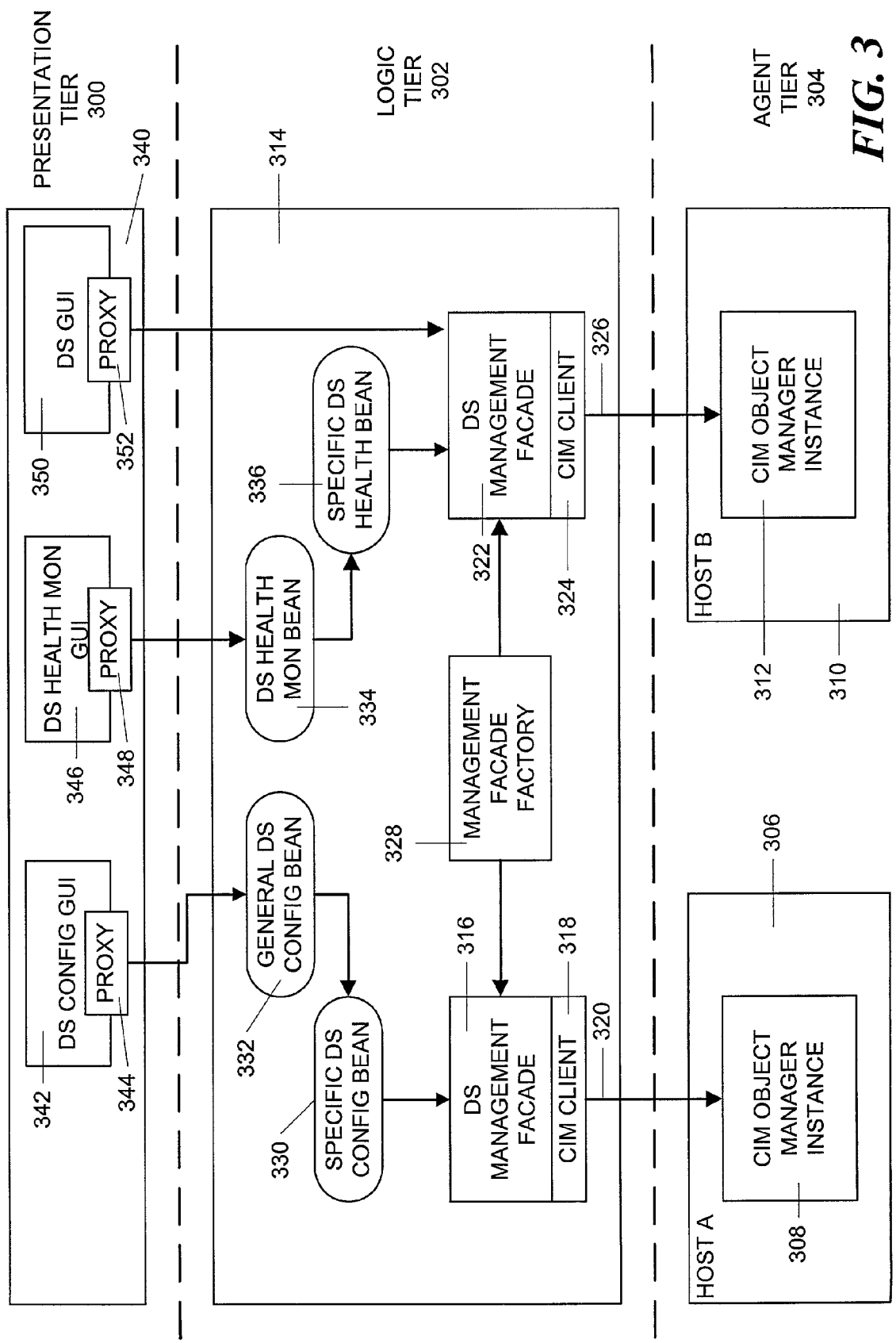
FIG. 3 is a block schematic diagram of a three-tiered system including the agent tier illustrated in FIG. 2, a logic tier running in a management server and implemented with federated beans and a presentation tier that can run elsewhere in the network.

FIG. 3 illustrates the three tiers of the present invention including a presentation tier 300, a logic tier 302 and the agent tier 304. As shown, the agent tier 304 contains two hosts 306 and 310, but the system may contain one host or more than two hosts. Each host would be arranged as shown in FIG. 2 with a CIM object manager and CIM providers. The CIM object managers for hosts 306 and 310 are shown as object managers 308 and 312, respectively. The providers have been omitted from FIG. 3 for clarity.

CIM data in CIM objects can be accessed by a CIM client in accordance with a protocol called Web Based Enterprise Management (WBEM). WBEM is an industry-wide initiative that includes standards for web-based management of systems, networks, and devices on multiple platforms. This standardization enables system administrators to manage desktops, devices, and networks. WBEM is designed to be compatible with all major existing management protocols, including Simple Network Management Protocol (SNMP), Distributed Management Interface (DMI), and Common Management Information Protocol (CMIP). WBEM encompasses the CIM model, a managed object format (MOF) language for defining CIM classes and instances and an extensible Markup Language (XML), a generalized markup language that can be used to describe managed resources on the web.

In FIG. 3 two CIM clients 318 and 324 can access CIM object managers 308 and 312, respectively over a connection on the network connecting the computer on which the logic tier 302 resides with the host computers 306 and 310. These network connections are indicated schematically by arrows 320 and 326, respectively. A WBEM client application, such as client application 318, contacts a CIM Object Manager, such as manager 308, to establish a connection, shown schematically by arrow 320, when the client needs to perform WBEM operations, such as creating a CIM class or updating a CIM instance. When WBEM client application 318 connects to the CIM object manager 308, the WBEM client 318 gets a reference to the CIM Object Manager 308, which the client then uses to request services and operations.

The clients 318 and 324 are located in the logic tier 302, which may, for example, be part of a management server 314 located in any computer in the distributed system. This latter host may be one of hosts 306 or 310 or may be a completely different computer system connected to the network. The logic tier 302 is implemented with a plurality of Federated Java™ (trademark of Sun Microsystems, Inc.) beans and management facades. The federated beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments.

The federated beans use a distributed management framework that implements the FMA specification for distributed management of data services. This framework is called the Jiro™ framework (trademark of Sun Microsystems, Inc.) and is developed by Sun Microsystems, Inc. This framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. The framework provides dynamic services beans of the middle tier. Dynamic services require a hosting entity called a "station", which is a mechanism to allow many services to run within a single Java Virtual Machine. Every management domain contains one or more general-purpose shared stations. These stations may be private or shared. For example, the federated beans and management facades of the logic tier 302 can be deployed in a shared Jiro™ station.

In addition, the Jiro™ technology provides a lookup service that is used to register and locate all Jiro™ technology services, including both base and dynamic services, that are available in a management domain. Details of the Jiro™ framework and its use are available in the "Jiro™ Technology SDK Programmer's Reference Manual".

For data services management purposes, the main federated bean is the specific data service configuration bean 330. Although only one data service configuration bean 330 is illustrated in FIG. 3, a separate bean would be provided for each data service. For example, configuration beans might be provided for each of volume control services, data imaging services, network data replication services and cache control services among other services. Bean 330 is a Federated Bean as described in the aforementioned Federated Management Architecture (FMA) specification. When created, it registers itself with a local Jiro™ station, and provides its services to other federated beans within the same Jiro™ management domain.

Bean 330 interacts with a data service management facade 316 that, in turn, connects to the CIM client 318. The management facade 316 provides a means by which the CIM client 318 can be accessed and managed as a Jiro™ service, i.e., a service that can be managed in a distributed environment from a remote host. The management facade 316 is essentially an object-oriented model of the CIM client 318 and provides a collection of APIs to manage the CIM client 318. Management facades, such as management facade 316 are created and destroyed by a management facade factory 328. The management facade factory 328 will instantiate and delete data services management facades, such as facade 316 upon receipt of appropriate intrinsic CIM instance creation/deletion events from the CIM object manager 308 when CIM providers (not shown in FIG. 3) are created and deleted in the host 306.

Data services have some common usage rules. For example, any data storage volume used by the data imaging or network data replication service must be identified to the volume control services (SV or STE as appropriate.) Thus, a common data service configuration bean 332 is implemented to handle these data service specific issues. The storage allocation service interacts with this common bean 330 as appropriate to manage the overall storage allocation.

In addition to functional beans that provide configuration services for individual data services, a CIM client, such as client 324, also interacts with a CIM object manager, such as manager 312 (as indicated schematically by arrow 326) to provide "health monitoring" services. Health monitoring services can further be categorized into three specific types: administrative services, error handling services and status checking services. An example of an administrative service would be setting and changing health monitoring polling time intervals. This is necessary because different data services need different polling cycles, as polling is intrusive in some cases. Another example is turning on and off a specific health monitoring service. In particular, if there is no need to run health monitoring for a data service (for example, when a data replication service is in logging mode while an administrator is fixing an already-detected problem in a secondary site), the administrator should be able to turn the health monitoring service off to save system resource usage.

Error handling services include taking corrective measures proactively when an error is detected. Examples include placing data replication services in logging mode when a network problem is detected and starting automatic synchronization between the replication sites when a network problem is fixed. Status reporting services include reporting various data service states back to an administrator. An example would be reporting the network status in a data replication service.

For data services health monitoring purposes, the main federated bean is the specific data service health monitoring bean 336. Although only one data service health monitoring bean 336 is illustrated in FIG. 3, a separate bean would be provided for each data service. For example, a health monitoring bean can be provided for each of volume control data services, data imaging data services, network data replication data services and cache control data services among other services.

For volume control services, the health monitoring bean monitors whether input/output operations to the volumes are completing successfully. If a volume becomes inoperative, the health monitoring bean will detect the failure. Similarly a data imaging health monitor bean can constantly monitor the health of the data imaging service, and a data replication health monitoring bean can detect any problems with the data replication service.

Bean 336 is a federated bean as described in the aforementioned Federated Management Architecture (FMA) specification. When created, it registers itself with a local Jiro™ station, and provides its services to other federated beans within the same Jiro™ management domain. Bean 336 interacts with a data service management facade 322 that, in turn, connects to the CIM client 324. The management facade 322 provides a means by which the CIM client 324 can be accessed and managed as a Jiro™ service, i.e., a service that can be managed in a distributed environment from a remote host. The management facade 322 is essentially an object-oriented model of the CIM client 324 and provides a collection of APIs to manage the CIM client 324. Management facade 318 is also created and destroyed by management facade factory 328. The management facade factory 328 will instantiate and delete data service management facade 322 upon receipt of appropriate intrinsic CIM instance creation/deletion events from the CIM object manager 312 when CIM providers (not shown in FIG. 3) are created and deleted in the host 310. As with the configuration services, a general health monitor bean 334 provides overall health monitoring for all data services.

The presentation tier 340 is comprised of web-based GUIs 342, 346 and 350, that would generally be provided via a conventional web browser. When one of the GUIs 342, 346 and 350 is invoked via the web browser, is uses the aforementioned Jiro™ lookup service to obtain a proxy (344, 348 and 352, respectively) to a corresponding federated bean. The GUI uses this proxy to make method calls on the federated bean to obtain the required information. Alternatively, the GUIs 342, 346 and 350 may use the services of a webserver in a remote management server to locate and control the federated beans 332, 334 and management facade 322. This latter type of operation is described in more detail in connection with FIGS. 6, 8A–B and 9A–D.

Figure 4:
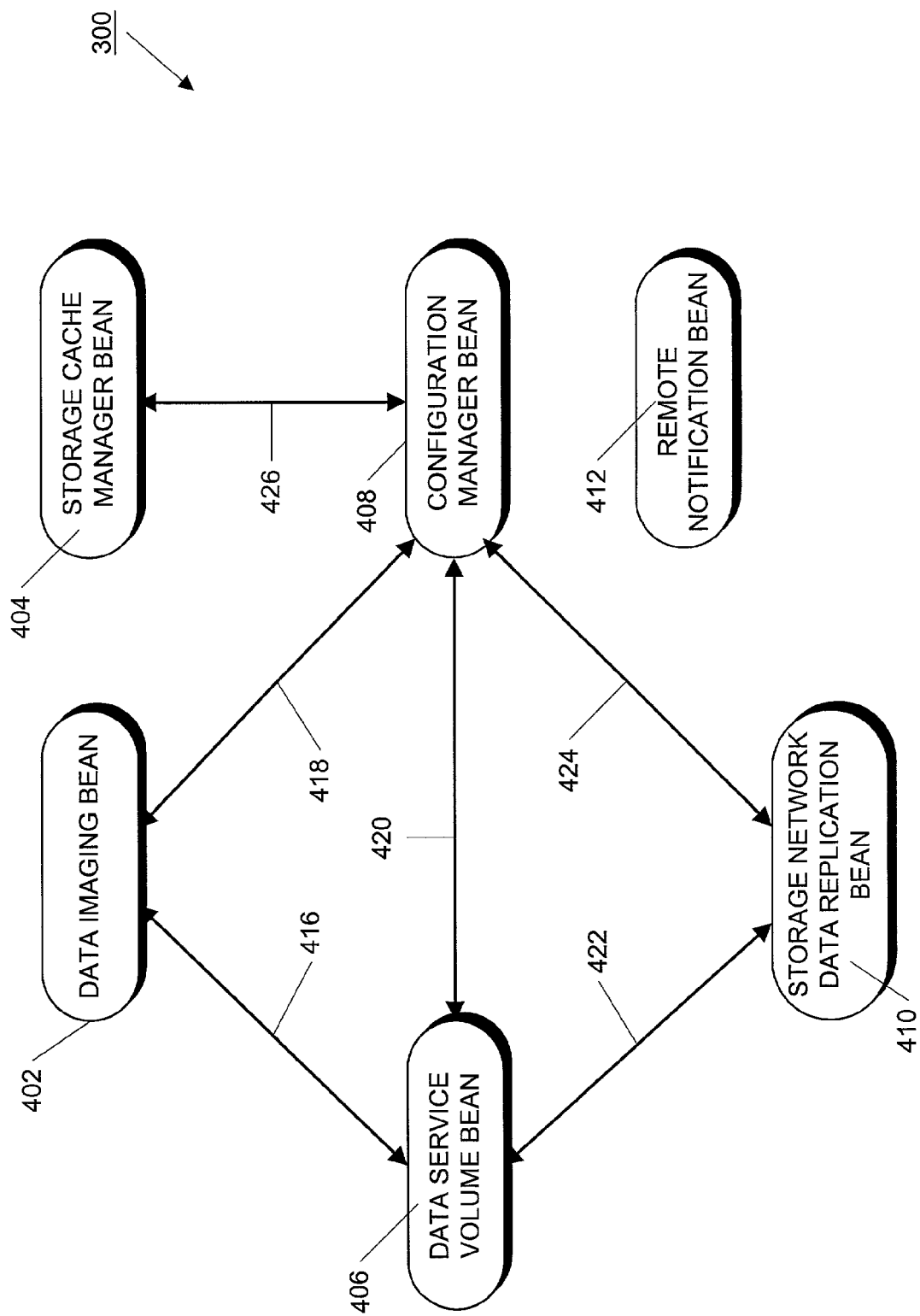
FIG. 4 is a block schematic diagram illustrating a collection of federated beans in an exemplary system and their interaction.

FIG. 4 illustrates a collection of federated beans as might be running in an exemplary management server. This collection represents the middle tier of a three-tier system. The corresponding presentation and agent tiers have been omitted for clarity. A client, such as a GUI or CLI, can use these beans by obtaining a handle, or identifier, to a bean from a lookup service, such as the Jiro™ lookup service. Once the handle is obtained, it can be used to access an interface exported by the bean and call appropriate methods in the interface. The middle tier 400 comprises a data-imaging bean 402 that manages a "point-in-time" volume copy data service between volumes in a data image volume set. The bean 402 allows a manager to configure, via a GUI or CLI (not shown in FIG. 4), the master, shadow and bitmap volumes and to set up a volume copy between the master and shadow volumes. Other administrative tasks can also be accomplished via the bean 402.

A storage cache manager bean 404 manages caching operations for selected disk volumes, including read caching, read ahead and small write coalescing for sequential writes. The bean 404 allows system administrators to engage or disengage the caching operations "on the fly" to allow optimum system usage. Bean 404 also gathers cache statistics to allow system administrators to monitor caching operations and controls non-volatile RAM cards to enable write caching.

Storage network data replication bean 410 manages a data replication system that replicates a primary volume to a secondary volume over a network. The bean 410 allows system administrators to select and configure the primary and secondary volumes and to set up and start the data replication system and monitor its progress.

Whenever beans 402 and 410 start and stop using a particular volume to provide the data services they control, they contact the data service volume bean 406 and use it to manage the volumes that they use as indicated schematically by arrows 416 and 422. In this manner, the data service volume bean 406 can keep track of volume usage and, in some cases, can provide information to a requesting bean regarding the identity of other services using a particular volume and the type of usage.

Whenever changes are made in the configuration of the data services and data volumes controlled by beans 402, 404 406 or 410, the beans can inform a configuration manager bean 408 of the change in configuration information or request configuration information as indicated schematically by arrows 418, 420, 424 and 426. Configuration manager bean 408 maintains the overall configuration of the data services on the host on which it resides and persists this information by means of a direct interface with a storage system. In this manner the information is available at boot up so that the system can be restarted after a power down or failure and is also available to management personnel during the normal operation of the system.

Figure 5:
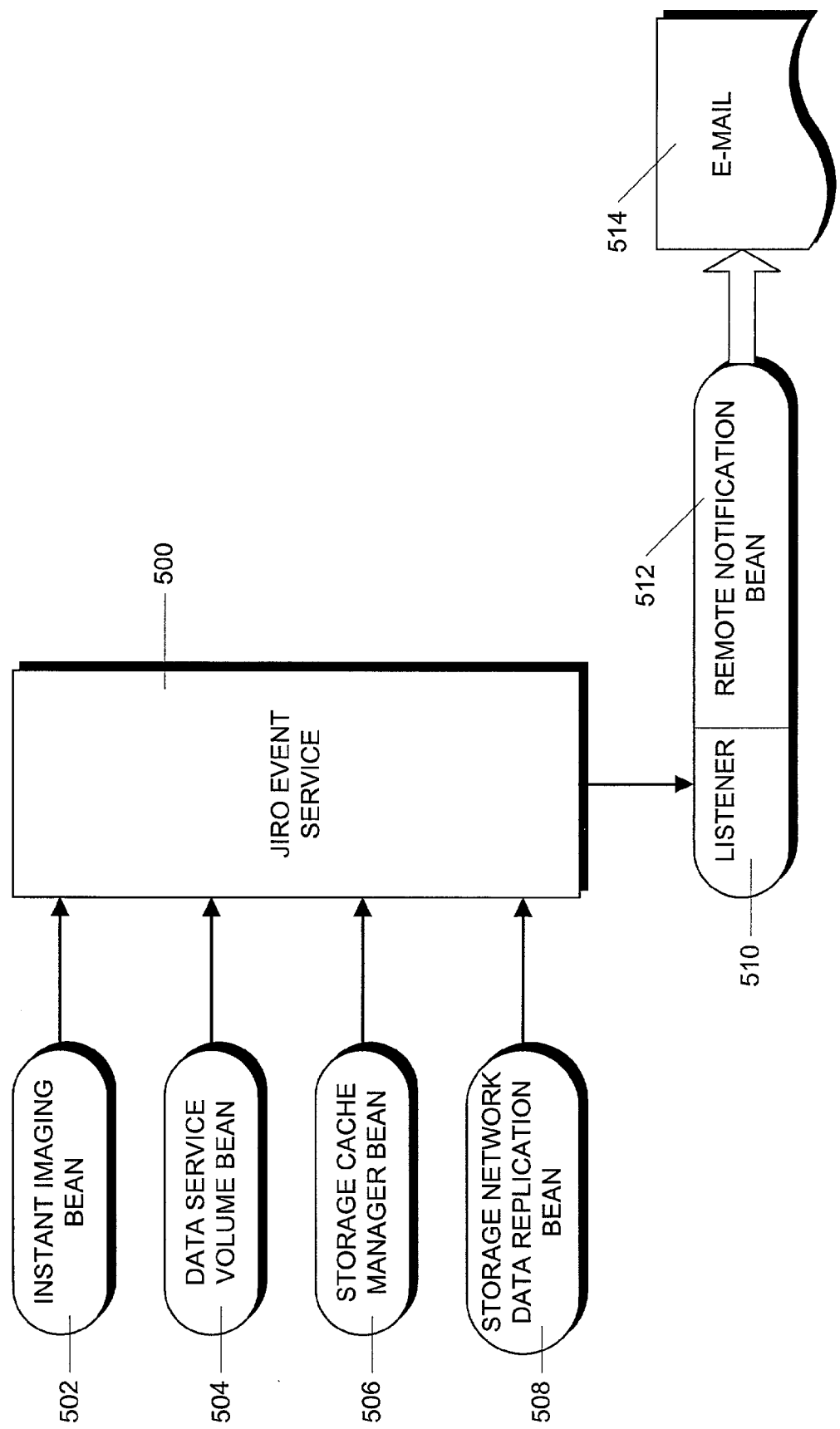
FIG. 5 is a block schematic diagram illustrating the operation of a remote notification bean in notifying administrators of management events in a data service management system.

A remote notification bean is also provided. As will be discussed below, the remote notification bean monitors events generated by the other beans and posted to an event service, such as the Jiro™ event service and reports occurrences of event in which an administrator has indicated interest by a human readable notice, such as an e-mail. The operation of the remote notification bean 412 is illustrated in FIG. 5. During operation, the data service beans, including the data imaging bean 502, the data service volume bean 504, the storage cache manager bean 506 and the storage network data replication bean 508 generate event messages and forward the messages to the Jiro™ event service 500. For example, these messages may be generated when a data service configuration changes, when an error is encountered or when a process finishes. When it receives these event messages, the Jiro™ event service sends notifications to the remote notification bean 512 which is registered with the event service 500 as a listener 510. The remote notification bean 512 then generates a human readable message and forwards the message to a system administrator via a conventional delivery system, such as an e-mail system 514.

As previously mentioned, in one embodiment, the presentation tier 300 (FIG. 3) is implemented by a web-based GUI. In this embodiment, the web-based GUI for the data imaging management service is based on a framework called the "Struts" framework. The Struts framework is an open source framework useful in building web applications with Java Servlet and JavaServer Pages (JSP) technology. The framework is designed to encourage application architectures based on a Model-View-Controller (MVC) design paradigm. The framework includes, as primary areas of functionality, a controller servlet that dispatches requests to appropriate "Action" classes provided by an application developer, JSP custom tag libraries, and associated support in the controller servlet, that assists developers in creating interactive form-based applications and utility classes to support XML parsing, automatic population of JavaBeans properties based on the Java reflection APIs, and internationalization of prompts and messages.

The Struts framework is being developed as part of the Jakarta Project, sponsored by the Apache Software Foundation, 1901 Munsey Drive, Forest Hill, Md. 21050-2747. Complete details of the Struts framework can be found at http://jakarta.apache.org/struts.

Figure 6:
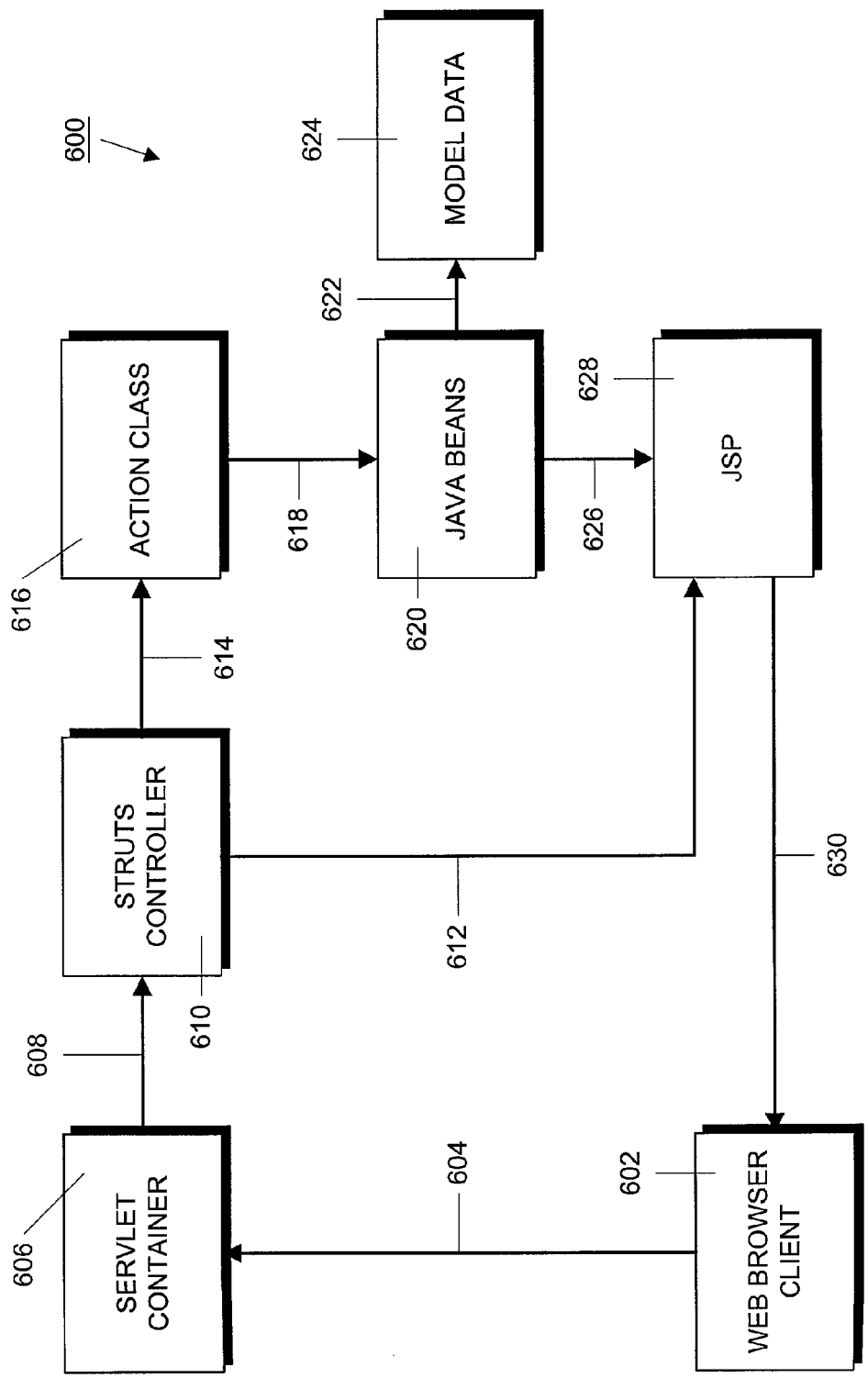
FIG. 6 is a block schematic diagram of a presentation system as implemented using a Struts framework.

FIG. 6 illustrates the overall architecture of the user interface framework 600 used in the illustrative embodiment and based on the Struts framework. The user interacts with a client interface that, in turn, uses the well-known Hypertext Transfer Protocol (HTTP) protocol to communicate with the rest of the system. In one embodiment, the client could be a web browser, such as web browser 602. In other embodiments, the client could be a corresponding command line interface (not shown in FIG. 6.)

For example, the client could be implemented as a form written in HTML which can be displayed in web browser 602 and accept input. Forms for controlling a data service might include, for example, a form directed to manipulating data imaging. This form could accept as input, a set name, two volume names, two bitmap volumes, and options for the set type. Similarly, an HTML form for manipulating data imaging groups could accept as input, a group name, multiple set names, and options to attach an overflow volume.

Information retrieved via the client 602 is sent, as indicated by arrow 604, to the servlet container 606 to be processed. The servlet container 606 would normally be container within a web server (not shown in FIG. 6.) Web server software suitable for use with the present invention is Tomcat web server software available from the aforementioned Apache Software Foundation.

Servlets are programs that run within the web server and process requests from an HTTP client. The servlet container that is bundled with the Tomcat web server supports all servlet activity. In this architecture, the servlet container provides the appropriate libraries to process requests. For a data imaging service required libraries include the Jiro™ Federated Bean, Management Facade, and related Jiro and CIM libraries. Once the necessary resources are confirmed, the servlet container passes control to the struts controller 610.

The Struts controller 610 bundles and routes HTTP requests to other objects in the framework. It is responsible for the flow of control and maps requests to the appropriate handlers. The controller 610 creates one instance of an Action class, such as class 616, and uses this instance for all requests. Specifically, for the data imaging system, if the Struts controller 610 can make a successful mapping to an appropriate handler, it will forward to a path name, such as "/IIJiro" to the handler, otherwise it will record a failure and send the error results to the Java Server Pages 628 to be displayed as described below and as indicated schematically by arrow 612.

Action class 616 receives a request from the Struts controller 610 and interprets information in the request. Class 616 then instantiates an appropriate Java Bean with the given information as schematically illustrated by arrow 618. After locating the bean and completing some task, class 616 can also forward the request to another action class (not shown in FIG. 6.) In a data service system, the Action class 616 is a DoConnectJiroBean class. This class parses and interprets information in a client request, including the information submitted by the client. Once the parsing is complete, the DoConnectJiroBean class instantiates one of the aforementioned federated beans with the appropriate input and begins to call the bean methods as necessary. This latter action is indicated schematically by arrow 618.

Usually, the federated beans use a form of Java Remote Method Invocation (RMI) to retrieve their data. The model data 624 for this prototype lies in CIM providers objects and Jiro Management Facades. The model data 624 that the federated bean retrieves is sent to the Java Server Pages 628 to be displayed as indicated by arrow 626. In addition, the Java Server Pages 628 can send requests to the Java beans for particular information to display. In a data service system, the federated bean acts as a wrapper to the data model 624. The bean does a lookup of the data model components, that is the management facade or the CIM client, using the Jiro lookup service. Once a proxy to these remote objects is received, real time data from the model data 624 can be retrieved by calling methods on the bean.

A Java Server Page 628 is used to incorporate dynamic data into an HTML page. The JSP 628 gets its data from the Java Beans 620 and therefore separates the processing of data from the representation of the data. The JSP 620 then sends its information back to the client browser for display as indicated by arrow 630. In a data service system, the JSP 628 creates a reference to the existing instance of a federated bean and begins to call the methods on the bean. The information that the bean returns is formatted and displayed to the client by the JSP 628.

Figure 7:
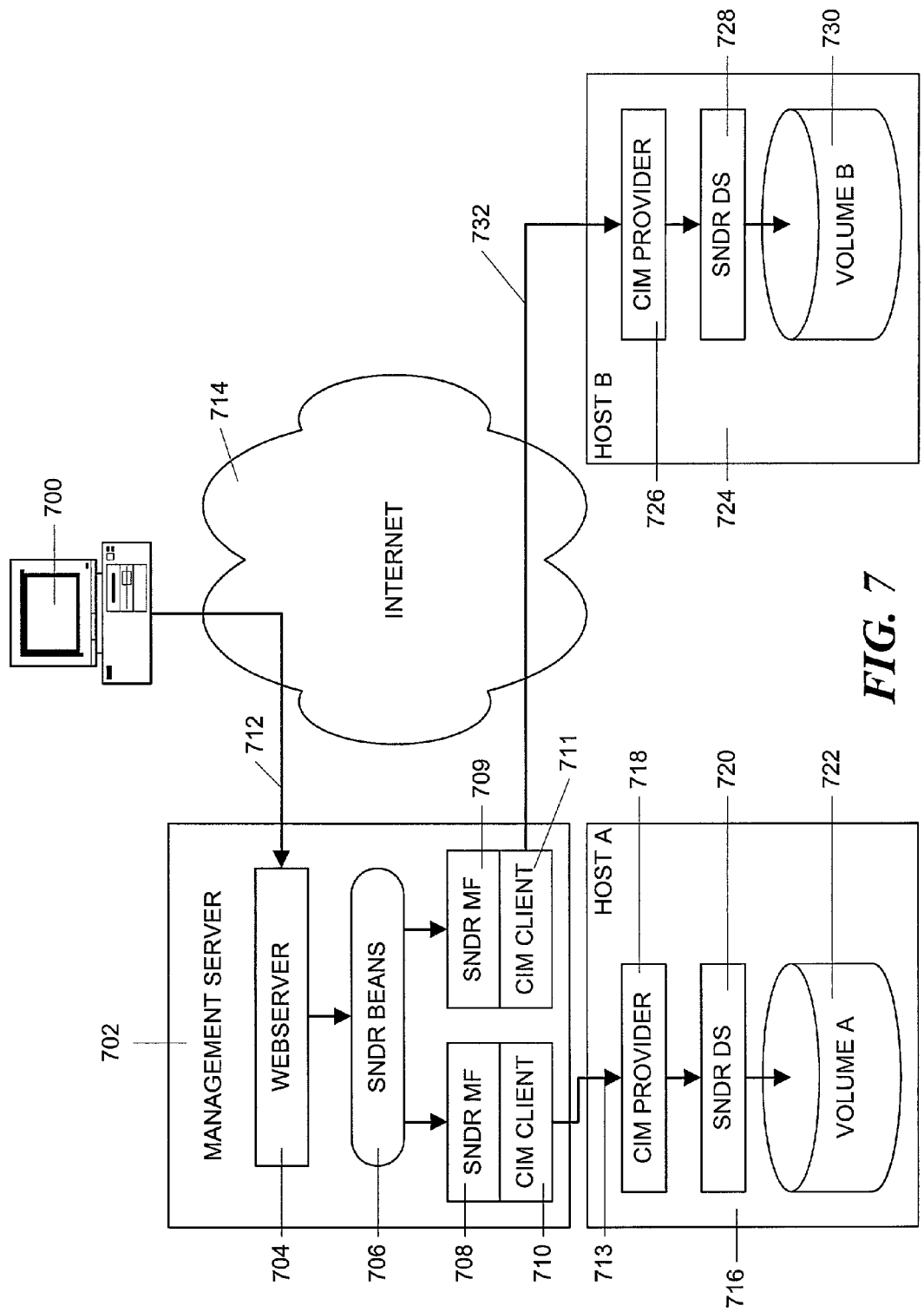
FIG. 7 is a schematic block diagram illustrating the implementation of a simple data replication system using the principles of the present invention.
Figure 8A:
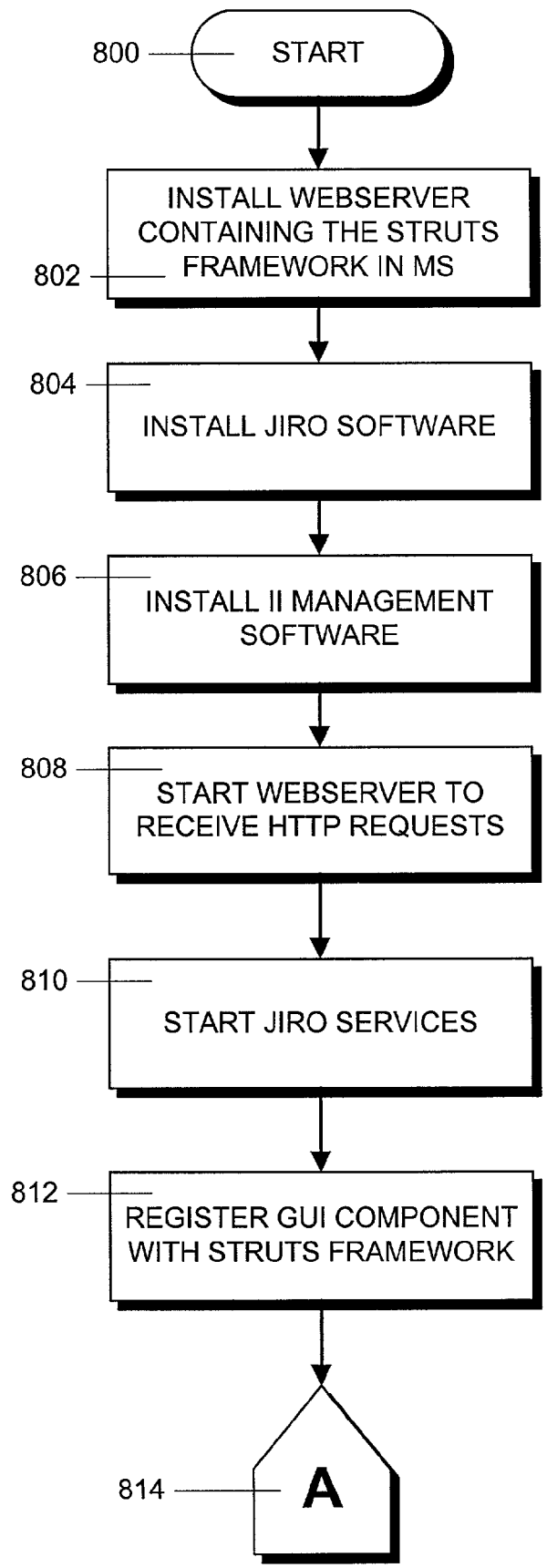
FIGS. 8A and 8B, when placed together, form a flowchart showing the steps of an illustrative process for installing data replication software in the system of FIG. 7.
Figure 8B:
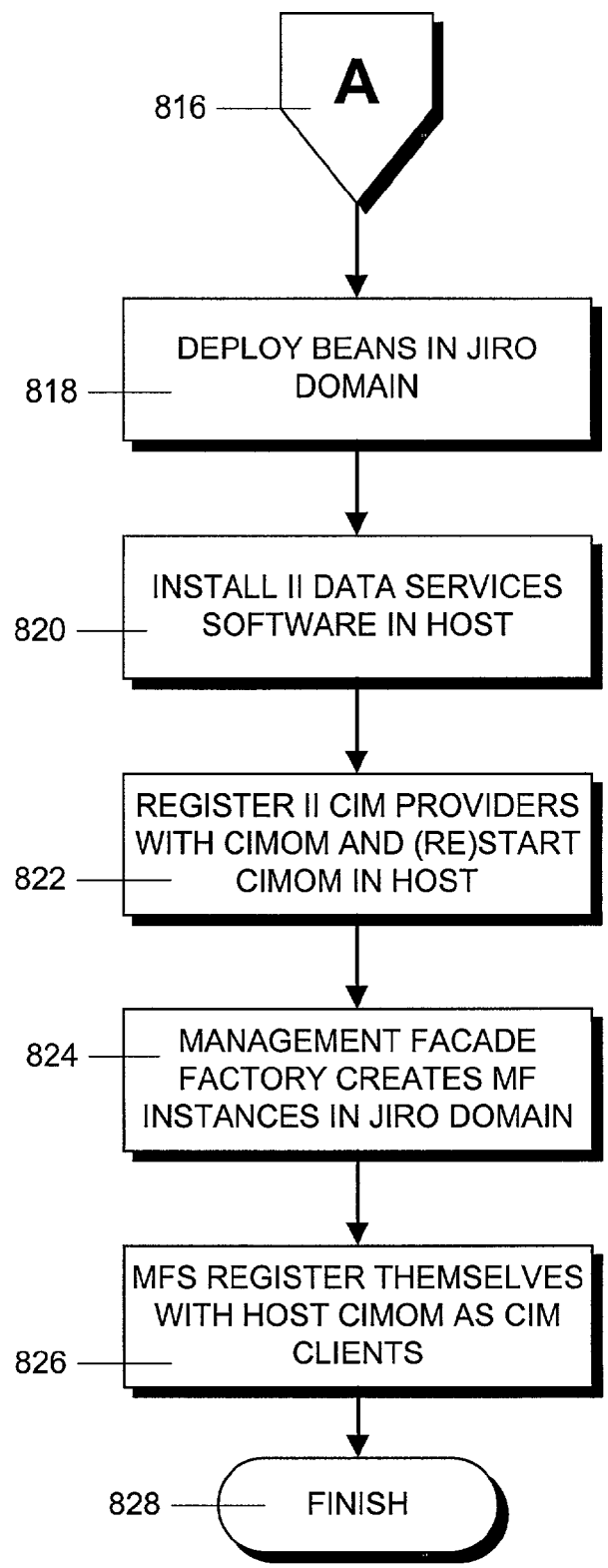
Figure 9A:
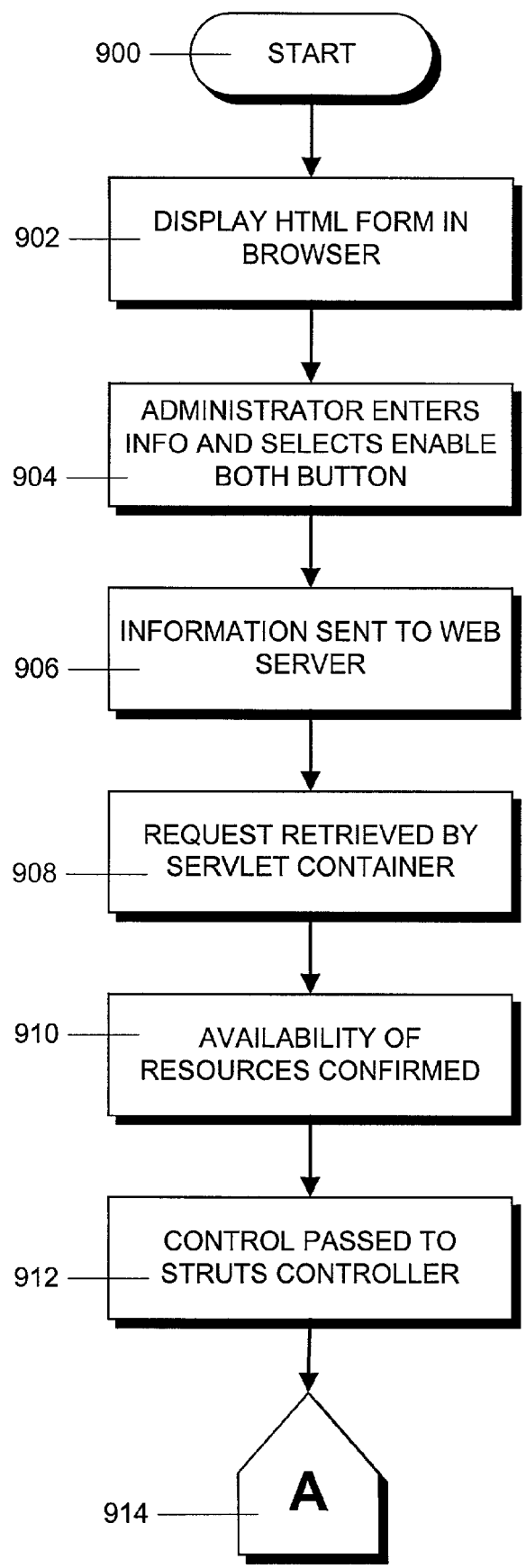
FIGS. 9A–9D, when placed together, form a flowchart showing the steps of an illustrative process for configuring the data replication system of FIG. 7.
Figure 9B:
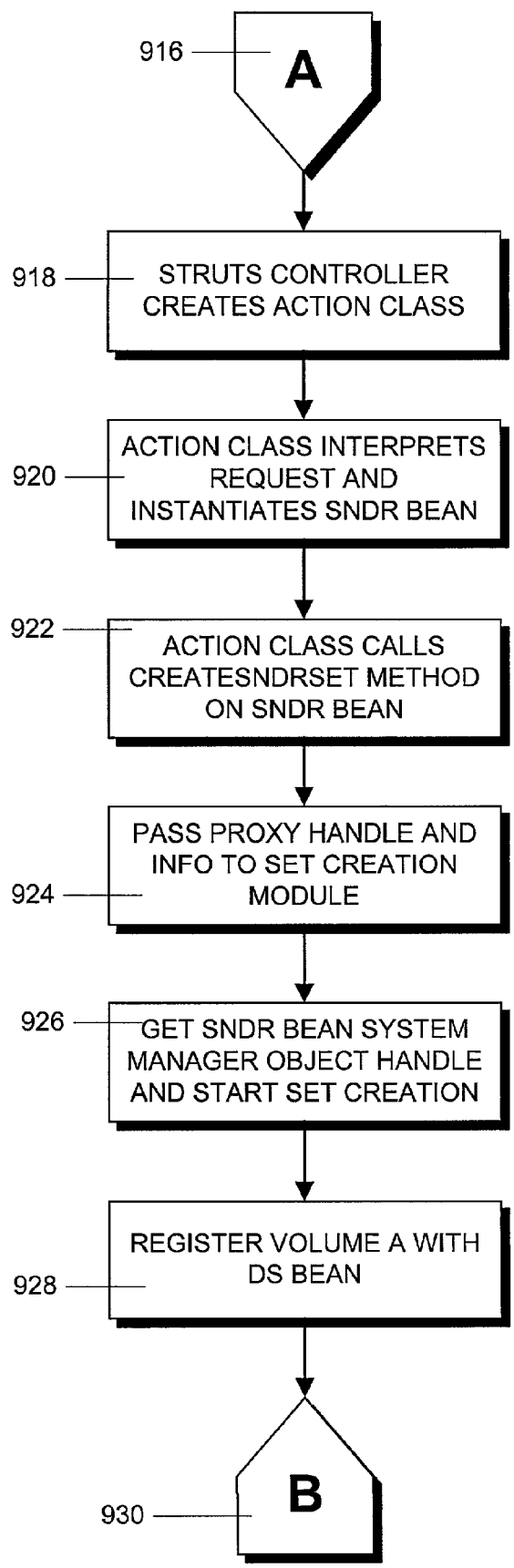
Figure 9C:
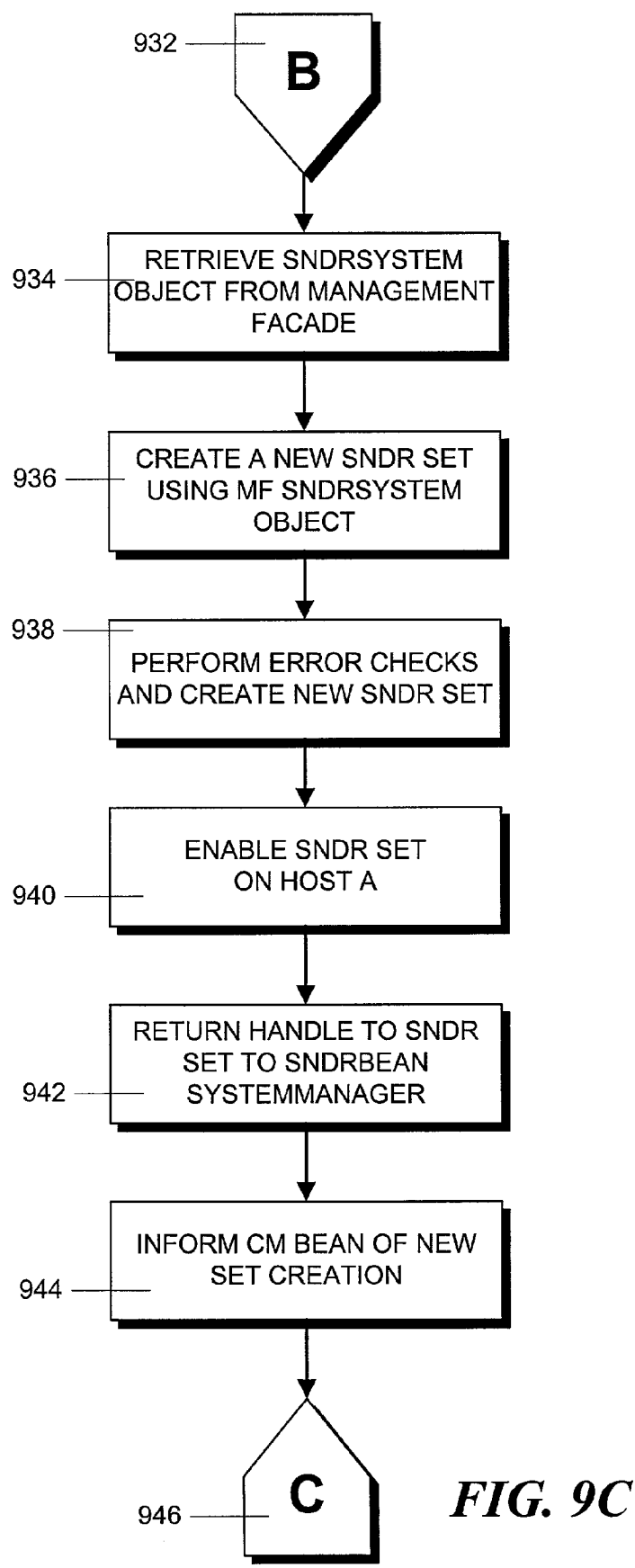
Figure 9D:
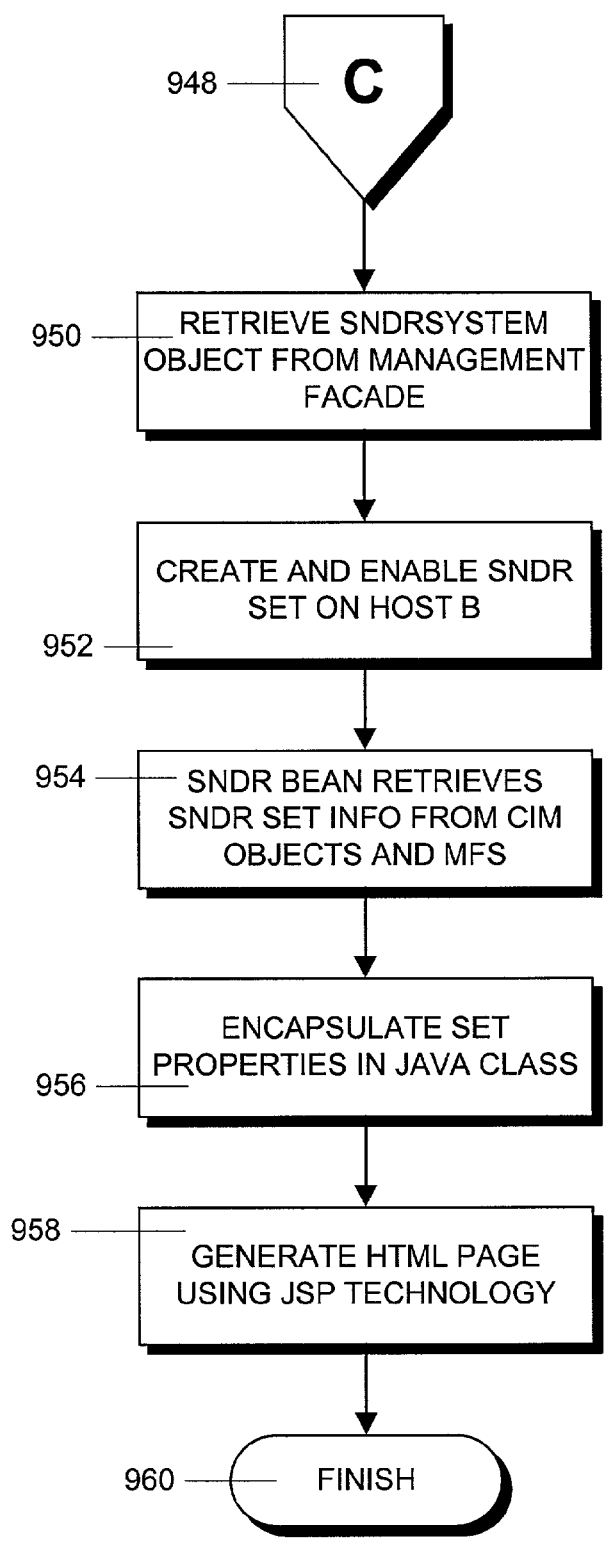

An example data service system that performs data replication is illustrated in FIG. 7. FIGS. 8A and 8B illustrate the steps performed in initially configuring the system. FIGS. 9A–9D show a flowchart illustrating the steps carried out by the inventive data replication system to set up the configuration shown in FIG. 7 and to remotely replicate data from volume A (722) of host system A (716) located in geographic region I to volume B (730) of host system B (724) located in a different geographic region II using a data replication services constructed in accordance with the principles of the invention, via network 714.

In order to use the inventive system, the software that is required must first be installed in the system, including the management server system 702, the host A system 716 and the host B system 724. Note that in FIG. 7, the management server system 702 is illustrated as a different system from the host systems 716 and 724. However, the inventive data replication system can also operate with a configuration in which the management server and one of the hosts are on the same computer system. The steps of the installation process are shown in FIGS. 8A and 8B. The installation process begins in step 800 and proceeds to step 802 where a webserver 804 containing the STRUTS framework (if that framework is to be used to process the request) is installed in the management server 802 and, in step 804, the Jiro™ software is installed in the management server 802. The installation process for this software is explained in detail in the aforementioned Jiro SDK.

In step 806, the SNDR management software is installed in the management server system 802. This software includes the management facade factory 328 (FIG. 3) and the federated beans 706 (comprising a data replication bean 310 and other beans that are necessary, such as the DSV bean 306 and the configuration manager bean 308).

In step 808, the webserver 704 is started so that it can receive http requests via the Internet 714 from a GUI component, such as a web browser, in terminal 700 as indicated schematically by arrow 712. In step 810, the Jiro™ services software is started and, in step 812, the GUI component in terminal 700 is registered with the STRUTS framework in the webserver 704.

The installation routine then proceeds, via off-page connectors 814 and 816, to step 818. In step 818, the data replication bean and other federated beans are deployed in the Jiro domain.

Next, the data services software used for data replication is installed on both of the host systems 716 and 724. This software 720 includes the data service layer software 252 (FIG. 2), the SNDR layer 254 and the native interfaces, 242 and 246. Other layers, such as a data-caching layer can also be included in this installation process. In general, the CIM object manager instance 230 would be part of the operating system on the host and would not need to be separately installed. The managed object format files that are used to create the CIM providers would also have been previously installed.

In order to create instances of the CIM providers 718 and 726, the MOF files must be registered with the respective CIMOMs. This is shown in step 822 where the MOF files are registered with the CIMOMs (not shown in FIG. 7) in the hosts 716 and 724 and the CIMOMs are restarted, if they are already running, or started, if they are not already running. When the CIMOMs are restarted, they create instances of the required CIM providers in accordance with the MOF files as previously described. During this process, appropriate creation events are generated by the CIMOMs.

In response to the creation events generated by the CIMOMs, the management facade factory 328 creates instances on the corresponding management facades 708 and 709 in the appropriate Jiro™ domain as set forth in step 824.

Next, in step 826, the management facades register themselves with each host CIMOM as CIM clients 810 and 811. The process then finishes in step 828.

After the installation and deployment steps are complete in both host A 716 and host B 724, the process of configuring the system can begin. The steps involved in this process are illustrated in FIGS. 9A–9D. During this process, the system manager at terminal 700 uses the SNDR GUI to send information to the web server in order to create an action class that causes an SNDR set in both host A 716 and host B 724 to be created and enabled. The action class then synchronizes volume B 730 (the secondary volume) with volume A 722 (the primary volume). Once the synchronization is complete, the SNDR set will be in REPLICATING mode. From that time, all the input/output information sent to volume A 722 will automatically be replicated to volume B 730, and the content of both the volumes will be the same (that is, "mirrored").

The configuration process begins in step 900 and proceeds to step 902 where a web browser running in terminal 700 displays an HTML form that accepts the parameters necessary to create two SNDR volume sets. This form includes a text field for each of the two host names and text fields for their corresponding volumes and bitmap volumes. The form also includes option buttons for selecting an appropriate action, such as a forward or reverse sync, or update, and command buttons for initiating the process. In step 904, an administrator enters the required information, selects the appropriate action and selects a command button to begin the process.

In step 906, the information submitted via the HTML form is sent to the web server 704 as a create request and, in step 908, the request is retrieved by a servlet container (606, FIG. 6) which runs within the web server 704. In step 910, the servlet container 606 confirms that resources necessary to run the application are available. These resources include an SNDR Jiro™ Federated Bean, an SNDR Management Facade, and other Jiro™ and CIM related libraries. Once the necessary resources are confirmed, the servlet container 606 passes control to a STRUTS controller 610 in step 912. The process then proceeds, via off-page connectors 914 and 916 to step 918.

The controller 610 bundles and routes HTTP requests to other objects in the framework illustrated in FIG. 6. It is responsible for the flow of control and maps requests to appropriate handlers. In step 918, controller 610 creates one instance of an action class 616 and uses it for all requests. In this example, controller 610 creates an instance (DoConnectSNDRJiroBean) of an SNDRConnectionAction class in step 918. Specifically, for creating an SNDR set, when the struts controller 610 can make a successful mapping to an appropriate handler, it will forward the request to the path name "/SNDRJiro", otherwise the controller will record a failure and send the error results to the JSP 628.

The DoConnectSNDRJiroBean class 616 receives requests from the controller 610 and interprets information in the request as set forth in step 920. Specifically, the DoConnectSNDRJiroBean parses the request into key/value pairs. For example, assume the administrator submits the following values for the primary and secondary host, volume and bitmap volume names:

| host names: | ns-east-39 | chl-lab1270-dhcp-5 |
|---|---|---|
| volume names: | /deve/vx/rdsk/ndrdg/vol1 | /deve/vx/rdsk/ndrdg/vol3 |
| bitmap names: | /deve/vx/rdsk/ndrdg/vol2 | /deve/vx/rdsk/ndrdg/vol4 | the DoConnectSNDRJiroBean action class will assign these values to appropriate keys as follows:
server1=ns-east-39
server1Vol=/deve/vx/rdsk/ndrdg/vol1
server1Bit=/deve/vx/rdsk/ndrdg/vol2
server2=chl-lab 1270-dhcp-5
server2Vol=/deve/vx/rdsk/ndrdg/vol3
server2Bit=/deve/vx/rdsk/ndrdg/vol4

The DoConnectSNDRJiroBean action class 616 then instantiates an SNDR JiroBean with the given information and receives a proxy handle to the bean. The DoConnectSNDRJiroBean action class 616 uses the information gathered from the request and calls the methods on the SNDRJiroBean as necessary using the proxy handle. After instantiating the bean and completing some task, the DoConnectSNDRJiroBean action class can also forward information to another action class.

Federated Jiro™ Beans contain the substance of the architecture. Once the SNDRJiroBean is instantiated by the action class, it will provide the business logic and model data that enriches the program. The bean exposes a set of methods that will use the data initially submitted by the administrator. In creating the SNDR set given the primary and secondary host, volume and bitmap names above, the DoConnectSNDRJiroBean action class would call a createSNDRSetStaticProperties(primaryVolName, primaryHostName, primaryBitMap, secondaryVolName, secondaryHostName, secondaryBitMap) method of the SNDRBean as set forth in step 922. The parameters in this method are filled with the data mapped above in step 920.

Next, in step 924, the DoConnectSNDRJiroBean action class forwards the proxy handle of the SNDRJiroBean and the other method parameters in the SNDR set creation method to a SNDR GUI set module or subprogram (realized by a Java class) that performs the rest of the specialized steps involved for SNDR set creation.

In step 926, the SNDR GUI set creation module then calls a getSNDRBeanSystemManager( ) method on the SNDR federated bean proxy handle to retrieve a handle to a SNDRBeanSystemManager object which manages the overall SNDRSystem and provides APIs to create SNDR sets. The SNDR GUI set creation module then informs the SNDRBeanSystemManager of its intention to create a SNDR set using the user-provided parameters for different components of the SNDR set by calling an initializeSet( ) method of the SNDRBeanSystemManager( ) object with appropriate arguments.

In the initializeSet( ) method, in step 928, the SNDRBeanSystemManager informs a data service volume federated bean (406, FIG. 4) running on host A 716 about volume A 722 in this host that the SNDR federated bean 706 is going to use. The SNDRBeanSystemManager does that by calling a registerSVIVolume( ) method of the data service volume federated bean with appropriate volume names as arguments in order to register the volumes with the data service volume federated bean.

The process then proceeds, via off-page connectors 930 and 932 to step 934 where, the SNDRBeanSystemManager object calls a getSNDRSystem( ) method of SNDR bean 706. Inside the getSNDRSystem( ) method, SNDR bean 706 contacts the SNDR management facade 708, retrieves a handle to the SNDRSystem object that the management facade 708 is using as the manager of individual SNDR sets and groups, and returns the handle to the SNDRBeanSystemManager object.

Once the SNDRBeanSystemManager object gets the SNDRSystem handle from the management facade layer 708, in step 936, it asks the SNDRSystem object to create a SNDR set with the user provided data by calling an initializeSet( ) method of the SNDRSystem object. This latter method call is at the management facade layer 708 and, in the initializeSet( ) method, the task of set initialization gets delegated to another initializes method of the SNDRManagerImpl, a module/subprogram implements the management facade SNDRSystem.

In step 938, the SNDRManagerImpl initializes method first performs several error checks. For example, it checks for the validity of the user provided data and whether the resulting SNDR set will violate any constraints, etc. If all the checks are passed, then a new SNDRSet object is created and added to the list of the SNDR sets managed by this SNDRManagerImpl. At this stage, the newly created SNDR set is in DISABLED state and the kernel does not yet know of this set.

In step 940, the SNDRManagerImpl object calls the enable( ) method of this newly-created SNDR set. In this enable( ) method, a set of native interface objects are created to communicate with the host A kernel. These native interface objects are populated with the appropriate SNDR set information and SNDR data services layer 720 is requested to enable a SNDR set with the information passed through these native objects. The data services kernel layer 720 then enables the set by updating/creating new internal kernel data structures. The enabled set goes into LOGGING mode immediately as host B might, or might not, be ready. (In the situation described now, the other side is actually not ready yet.) In any case, the kernel does not automatically try to enter REPLICATING mode by contacting the other host.

Next, in step 942, after the new SNDR set is created and enabled, a handle to it is returned to the SNDRBeanSystemManager object. The SNDRBeanSystemManager then contacts, in step 944, a configuration manager federated bean running on host A (408, FIG. 4) in order to indicate that a new SNDR set has been created. The configuration manager federated bean 408 stores the information related to this new SNDR set. This configuration information can be retrieved later. The process then proceeds, via off-page connectors 946 and 948, to step 950.

In step 950, the SNDRJiroBean 706 retrieves a second SNDRSystem object from the SNDR management facade associated with the CIM client 711 that operates with host B 724 where the data in volume A 722 will be replicated for this SNDR set. CIM client 711 contacts the CIM provider 726 in host B 724. This contact is made, via the Internet 714, as indicated schematically by arrow 732.

In step 952, an SNDR set is created and enabled on host B 724 by performing the process similar to that detailed in steps 936 through 944. During this process, the SNDR data service layer 728 is used to create the new SNDR set.

At this point, a new SNDR set has been created and enabled at both hosts 716 and 724 and the GUI command issued in step 904 has been completed. In step 954, the SNDRJiroBean 706 uses a form of Remote Method Invocation to retrieve data resulting from the set creation. This data is retrieved from CIM objects 718 and 726 and Jiro management facades 708 and 709. If the SNDR sets are successfully created, the retrieved set properties are encapsulated in a Java class, SNDRSetProperties.

In step 956, the set properties encapsulated in the SNDRSetProperties class are extracted and formatted for the JSP.

Finally, in step 958, an HTML page is generated using JSP technology to create a "operation successfully executed" response page to the user. In particular, the set properties are displayed in a frame on the HTML page. Alternatively, the Java server pages can send requests directly to the SNDRJiroBean 706 to request particular information to display, thereby bypassing steps 956 and 958. The process then finishes in step 960.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A method for managing a data service in a distributed computer system having a management terminal connected by a network to a host computer system and at least one storage device connected to the host computer system by driver software, the method comprising:
   (a) running in the host computer system, a Common Information Model (CIM) object manager containing a CIM provider that can configure the driver software to provide the data service;
   (b) running in a management server, management facade software including a CIM client that can contact the CIM provider to control the CIM provider;
   (c) running in the management server a federated bean that generates method calls to the management facade software in accordance with business logic; and
   (d) providing data service commands from the management terminal to the federated bean to cause the federated bean to control the CIM provider to configure the storage device for the data service.

2. The method of claim 1 wherein the management terminal is located in a computer system different from the management server and wherein step (d) comprises providing data service commands from the management terminal over the network to the federated bean.

3. The method of claim 2 wherein the management terminal comprises a web browser and the management server comprises a webserver and wherein step (d) comprises providing data service commands from the web browser in the management terminal over the Internet to the webserver in the management server.

4. The method of claim 3 wherein step (d) further comprises instantiating the federated bean in the management server in response to the data service commands.

5. The method of claim 4 wherein the management server comprises a lookup service and wherein step (c) comprises using the federated bean to access the lookup service in order to locate the management facade software.

6. The method of claim 1 wherein the management server is located in a computer system different from the host computer system and wherein in step (b) the CIM client contacts the CIM provider over the network.

7. The method of claim 6 wherein the CIM client contacts the CIM provider over the network using a WBEM protocol.

8. The method of claim 1 wherein step (d) comprises using a graphical user interface in the management terminal to generate the commands.

9. The method of claim 8 wherein the graphical user interface comprises an HTML form in a web browser.

10. The method of claim 1 wherein step (a) comprises inserting a storage volume interface layer between the driver software and the storage device, inserting an additional data service interface layer between the storage volume interface layer and the storage device and using the storage volume interface layer to divert information passing between the driver software and the storage device to the additional data service layer.

11. The method of claim 1 wherein the distributed computer system comprises a plurality of host computer systems each having at least one storage device connected to the each host computer system by driver software and step (a) comprises running in each of the plurality of hosts a CIM object manager containing a CIM provider that controls data passing between the driver software and the storage device in the each host and that retrieves attributes of the data service; and step (b) comprises running, in the management server, management facade software including a CIM client for each host computer system that can contact one of the CIM providers in order to control the each host computer.

12. The method of claim 11 wherein step (c) comprises using the federated bean to control all of the management facade software.

13. Apparatus for managing a data service in a distributed computer system having a management terminal connected by a network to a host computer system and at least one storage device connected to the host computer system by driver software, the apparatus comprising:
a Common Information Model (CIM) object manager running in the host computer system and containing a CIM provider that can configure the driver software to provide the data service;
management facade software running in a management server and including a CIM client that can contact the CIM provider to control the CIM provider;
a federated bean running in the management server that generates method calls to the management facade software in accordance with business logic; and
a control mechanism that provides data service commands from the management terminal to the federated bean to cause the federated bean to control the CIM provider to configure the storage device for the data service.

14. The apparatus of claim 13 wherein the management terminal is located in a computer system different from the management server and the control mechanism comprises a mechanism that provides data service commands from the management terminal over the network to the federated bean.

15. The apparatus of claim 14 wherein the management terminal comprises a web browser and the management server comprises a webserver and wherein the control mechanism comprises means for providing data service commands from the web browser in the management terminal over the Internet to the webserver in the management server.

16. The apparatus of claim 15 wherein the control mechanism further comprises an action class that instantiates the federated bean in the management server in response to the data service commands.

17. The apparatus of claim 16 wherein the management server comprises a lookup service and wherein the federated bean comprises means that accesses the lookup service in order to locate the management facade software.

18. The apparatus of claim 13 wherein the management server is located in a computer system different from the host computer system and wherein the CIM client comprises means for contacting the CIM provider over the network.

19. The apparatus of claim 18 wherein the CIM client comprises means for contacting the CIM provider over the network using a WBEM protocol.

20. The apparatus of claim 13 wherein the control mechanism comprises a graphical user interface in the management terminal that generates the commands.

21. The apparatus of claim 20 wherein the graphical user interface comprises an HTML form in a web browser.

22. The apparatus of claim 13 further comprising:
a storage volume interface layer located between the driver software and the storage device and an additional data service interface layer located between the storage volume interface layer and the storage device and wherein the storage volume interface layer comprises a mechanism that diverts information passing between the driver software and the storage device to the additional data service layer.

23. The apparatus of claim 13 wherein the distributed computer system comprises:
a plurality of host computer systems each having at least one storage device connected to the each host computer system by driver software and the apparatus further comprises a CIM object manager running in each of the plurality of hosts and containing a CIM provider that controls data passing between the driver software and the storage device in the each host and that retrieves attributes of the data service; and
management facade software running in the management server and including a CIM client for each host computer system that can contact one of the CIM providers in order to control the each host computer.

24. The apparatus of claim 23 wherein the federated bean comprises means for controlling all of the management facade software.

25. A computer program product for managing a data service in a distributed computer system having a management terminal connected by a network to a host computer system and at least one storage device connected to the host computer system by driver software, the computer program product comprising a computer usable medium having computer readable program code thereon, including:
Common Information Model (CIM) object manager program code operable in the host computer system and containing CIM provider program code that can configure the driver software to provide the data service;
management facade program code operable in a management server and including CIM client program code that can contact the CIM provider program code to control the CIM provider program code;

federated bean program code operable in the management server that generates method calls to the management facade program code in accordance with business logic; and program code for providing data service commands from the management terminal to the federated bean to cause the federated bean program code to control the CIM provider program code to configure the storage device for the data service.

26. The computer program product of claim 25 wherein the management terminal comprises a web browser and the management server comprises a webserver and wherein the program code for providing data service commands comprises means for providing data service commands from the web browser in the management terminal over the Internet to the webserver in the management server.

27. The computer program product of claim 26 wherein the distributed computer system comprises:

a plurality of host computer systems each having at least one storage device connected to the each host computer system by driver software and the computer program product further comprises CIM object manager program code operable in each of the plurality of hosts and containing CIM provider program code that controls data passing between the driver software and the storage device in the each host and that retrieves attributes of the data service; and management facade program code operable in the management server and including CIM client program code for each host computer system that can contact the CIM provider program code in order to control the each host computer.

28. Apparatus for managing a data service in a distributed computer system having a management terminal connected by a network to a host computer system and at least one storage device connected to the host computer system by driver software, the apparatus comprising:

means running in the host computer system and containing a Common Information Model (CIM) provider for configuring the driver software to provide the data service;

means running in a management server for contacting the configuring means in order to control the configuring means;

means running in the management server for generating method calls to the contacting means in accordance with business logic; and means in the management terminal for providing data service commands from the management terminal to the federated bean to cause the federated bean to control the CIM provider to configure the storage device for the data service.

* * * * *